UNITED STATES PATENT OFFICE.

WILLIAM HARVEY, OF PORTLAND, MAINE.

IMPROVED COMPOSITION FOR PRINTERS' INKING-ROLLERS.

Specification forming part of Letters Patent No. 59,597, dated November 13, 1866.

*To all whom it may concern:*

Be it known that I, Dr. WILLIAM HARVEY, of Portland, in the county of Cumberland and State of Maine, have invented and discovered a new and useful Compound of Ingredients for Printers' Rollers; and I hereby declare the following to be a full, clear, and exact description thereof, which will enable others to make and use my invention.

My invention has for its object the production of a compound for printers' rollers which shall obviate some of the chief objections to which the present manufacture is liable—viz., want of sufficient toughness, being liable to shrink, soon wearing out, being affected by change in the weather or varying degrees of temperature, and other deficiencies, which will be hereinafter noticed. The common and ordinary mixture for this purpose, as is well known, is composed of glue and molasses. To this some other ingredients have subsequently been added, such as glycerine. This has been varied in different ways, but not with sufficient success to supersede in practice and business the old and original composition, although it is itself quite defective.

My material for printers' rollers is composed of the following ingredients, viz.: sugar-house sirup, glue, nitric and sulphuric acids. Instead of nitric and sulphuric acids, muriatic acid may be used, and for the sugar-house sirup, which I deem the best, sugar, honey, or common molasses may be employed. The composition is cheaper when manufactured of the nitric and sulphuric acids and sirup. When the muriatic acid is employed the quantity should be reduced to one-half the quantity of the two first named combined.

The proportions in which the above-named ingredients are united I will illustrate as follows: For a printer's roller of fifty pounds, take thirty-three pounds of sirup and seventeen pounds of glue. Pour upon the glue sufficient water to cover it, and let it remain about five hours. Then drain off the water. Then place the glue-dish into hot water or steam, and heat the same thoroughly, stirring constantly for twenty-five minutes or half an hour. Add sirup to the glue and thoroughly dissolve. To this add five ounces each of nitric and sulphuric acids. These are best introduced slowly and while stirring the mixture constantly. After the introduction of the acids, cook the whole over a fire sufficiently hot to keep the water boiling about one-half of an hour, the receptacle of the mixture being all the time in a vessel containing water, as before indicated. The preparation is then ready for casting.

The roller thus composed is claimed to be unaffected by its own revolution, and will not, in consequence thereof, fly in pieces, as is common with many others. It imbibes more freely the ink from the bed or in larger quantities. In rollers of the present construction fancy colors must be reduced before they can be used. With my roller they can be used from the pot as manufactured, and all inks can be used when stiffer or thicker, so as to impart a more distinct color. The presence of the acids prevents shrinking. The roller so constructed need not be cleaned but once a week, instead of daily, as customary; and then I advise the use of naphtha or benzine, as the ordinary lye or alkali bath would destroy the acid.

The extreme toughness of the material affords numerous advantages. It dispenses with frequent cleanings, permits the use of thirteen or fourteen different colors with the same pair of rollers, and prevents the roller being cut by even the finest ruling between the types or columns. When worn and misshapen by age the roller can be remelted and recast.

Another advantage of my improved roller is, that it can be used as soon as it is taken from the mold, while in the case of the ordinary rollers it is necessary for them to remain from one to two weeks after being molded to acquire sufficient solidity to admit of being used.

What I claim as my invention, and desire to secure by Letters Patent, is—

The compound of ingredients for printers' rollers, substantially as herein set forth and described.

DR. WM. HARVEY.

Witnesses:
WILLIAM H. CLIFFORD,
HENRY C. HOUSTON.